United States Patent
Dilz, Jr.

(10) Patent No.: US 11,536,839 B2
(45) Date of Patent: Dec. 27, 2022

(54) SIDE-LOOKING SPEED MEASURING DEVICE

(71) Applicant: Sports Sensors, Inc., Cincinnati, OH (US)

(72) Inventor: Albert E. Dilz, Jr., Cincinnati, OH (US)

(73) Assignee: Sports Sensors, Inc., Cincinnati, OH (US)

( * ) Notice: Subject to any disclaimer, the term of this patent is extended or adjusted under 35 U.S.C. 154(b) by 422 days.

(21) Appl. No.: 16/867,610

(22) Filed: May 6, 2020

(65) Prior Publication Data

US 2021/0349214 A1 Nov. 11, 2021

(51) Int. Cl.
| | |
|---|---|
| *G01S 17/42* | (2006.01) |
| *G01C 3/08* | (2006.01) |
| *G01S 17/48* | (2006.01) |
| *G01B 11/00* | (2006.01) |
| *G01S 17/00* | (2020.01) |
| *G01S 17/89* | (2020.01) |
| *G01S 17/58* | (2006.01) |
| *G01S 17/06* | (2006.01) |

(52) U.S. Cl.
CPC ............ *G01S 17/42* (2013.01); *G01B 11/002* (2013.01); *G01C 3/08* (2013.01); *G01S 17/006* (2013.01); *G01S 17/06* (2013.01); *G01S 17/48* (2013.01); *G01S 17/58* (2013.01); *G01S 17/89* (2013.01)

(58) Field of Classification Search
CPC ........ G01S 17/42; G01S 17/006; G01S 17/06; G01S 17/48; G01S 17/58; G01S 17/89; G01S 17/10; G01S 17/86; G01B 11/002; G01C 3/08
See application file for complete search history.

(56) References Cited

U.S. PATENT DOCUMENTS

| | | | |
|---|---|---|---|
| 5,528,246 A | 6/1996 | Henderson et al. | |
| 6,079,269 A | 6/2000 | Dilz, Jr. | |
| 6,666,089 B2 | 12/2003 | Dilz, Jr. | |
| 2019/0041419 A1* | 2/2019 | Abuella | G01P 3/36 |

FOREIGN PATENT DOCUMENTS

WO 2000037964 A1 6/2000

* cited by examiner

*Primary Examiner* — Nam D Pham
(74) *Attorney, Agent, or Firm* — Wood Herron & Evans LLP (57) ABSTRACT

Devices, methods, and computer program products for measuring the speed of an object. A speed measuring device includes a rangefinder module configured to measure distances from the device to a target object. Activating the device causes the device to measure a first distance from the device to the object along a first line-of-sight, and a second distance from the device to the object along a second line-of-sight. The device determines an angular displacement between the first line-of-sight and the second line-of-sight, and one or more of an elapsed time between measuring the first distance and measuring the second distance and a radial velocity of the object. The device then determines the absolute speed of the object based on the first distance, the second distance, the angular displacement, and one or more of the elapsed time and radial velocity.

18 Claims, 4 Drawing Sheets

SIDE-LOOKING SPEED MEASURING DEVICE

BACKGROUND

This invention generally relates to measuring the speed of an object from a distance and, in particular, to methods, systems, and computer program products capable of measuring absolute speed when the speed measurement device is positioned outside of a direct line of motion of the object.

Speed measuring devices that determine the speed of an object based on reflected signals are well known. For example, radar and lidar speed guns are often used by law-enforcement to determine the speed of vehicles on roadways and by trainers or spectators to determine speed during athletic activities, such as the speed of a pitched baseball. These devices have a common failing in that they only determine the rate at which the object is approaching or receding from the device. Thus, if the device is offset from the path of the object, the measured speed will be less than the actual speed of the object. The effect on measured speed due a non-zero angle between a line-of-sight from the device to the object and the velocity vector of the object is often referred to as the "cosine effect".

Due to the cosine effect, in order to obtain accurate speed measurements, conventional speed measuring devices must be positioned in line with the path of the moving object. However, it is not always practical or convenient to position the device in this way. Often, the most convenient position for the speed measuring device is nearly perpendicular to the to the path of the moving object. Since the cosine of ninety degrees is zero, the speed measured by the device in these situations will be highly inaccurate.

Thus, there is a need for improved devices, methods, and computer program products for measuring the speed of an object that enable accurate speed measurements from positions offset from the direction of movement of the object.

SUMMARY

In an embodiment of the invention, a speed measuring device is provided. The device includes one or more rangefinder modules each configured to measure distances from the device to a target object, one or more processors in communication with the one or more rangefinder modules, and a memory coupled to the one or more processors and including program code. The program code is configured so that when it is executed by the one or more processors, it causes the device to measure a first distance from the device to the target object along a first line-of-sight at a first time, measure a second distance from the device to the target object along a second line-of-sight at a second time, determine an angular displacement between the first line-of-sight and the second line-of-sight, and determine an absolute speed of the target object based on the first distance, the second distance, and the angular displacement.

In another embodiment of the invention, a method is provided. The method includes measuring, by the one or more rangefinder modules, a first distance from an observing position to the target object along the first line-of-sight at the first time and a second distance from the observing position to the target object along the second line-of-sight at the second time. The method further includes determining the angular displacement between the first line-of-sight and the second line-of-sight, and determining the absolute speed of the target object based on the first distance, the second distance, and the angular displacement.

In another embodiment of the invention, a computer program product is provided. The computer program product includes a non-transitory computer-readable storage medium, and program code stored on the non-transitory computer-readable storage medium. The program code is configured so that, when executed by one or more processors, the program code causes the one or more processors to measure the first distance from the observing position to the target object along the first line-of-sight at the first time and measure the second distance from the observing position to the target object along the second line-of-sight at the second time, determine the angular displacement between the first line-of-sight and the second line-of-sight, and determine the absolute speed of the target object based on the first distance, the second distance, and the angular displacement.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to a speed measuring device that uses a rangefinder to measure the distance from the device to a target object. At the time this initial distance is measured, the device starts a timer. After a period of time, the device may use the same rangefinder or another rangefinder to measure the distance from the device to the target object, stop the timer, and determine an angular distance traveled by the target object relative to the device. The device may then apply the law of cosines to determine the absolute speed of the target object based on the distance the object has traveled in the elapsed time, or to determine the absolute speed by adjusting a radial velocity obtained by the device at one or more of the starting position and the ending position.

Figure 1:
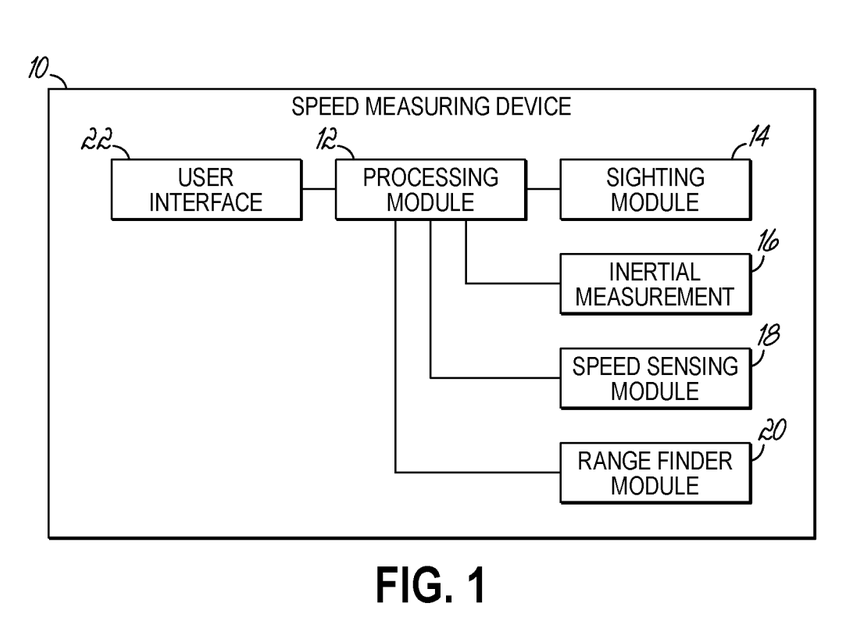
FIG. 1 is a diagrammatic view of a speed measuring device in accordance with an embodiment of the invention.

FIG. 1 depicts a speed measuring device 10 in accordance with an embodiment of the invention. The speed measuring device 10 includes a processing module 12, which may be in communication with one or more of a sighting module 14, an inertial measurement module 16, a speed sensing module 18, one or more rangefinder modules 20, and a user interface 22. The processing module 12 may communicate by transmitting signals to and receiving signals from the respective modules (e.g., over a serial bus or other suitable communication channel), and processes data and performs input and output operations necessary to operate the speed measuring device 10.

The sighting module 14 may be used to facilitate alignment of the speed measuring device 10 with a target object by a user operating the speed measuring device 10. The sighting module 14 may include an electronic imaging device (e.g., a video camera), passive optical device (e.g., a finder scope), a laser sight, or other sighting device (e.g., a gunsight) that indicates where the speed measuring device 10 is aimed. For embodiments of the invention in which the sighting module 14 includes the electronic imaging device, the sighting module 14 may include a built in display or provide signals to the processing module 12 that enable the processing module 12 to display sighting images on the user interface 22.

Sighting modules 14 having an electronic imaging device may include an imaging sensor (e.g., a Charge-Coupled Device (CCD) or an active-pixel sensor such as a Complementary Metal-Oxide-Semiconductor (CMOS) sensor). The imaging sensor may be sensitive to a wavelength of light emitted by the rangefinder module (e.g., infrared light). This sensitivity may enable the sighting module 14 or user interface 22 to show an area illuminated by the rangefinder module 20, thereby providing a positive indication of the point at which the rangefinder module 20 is aimed. In addition to displaying images or video captured by the imaging sensor, the processing module 12 may store all or a portion of the images or video in memory for later display or downloading, e.g., for use as evidence of speeding or for analyzing performance of an athlete.

The inertial measurement module 16 may be configured to provide one or more signals to the processing module 12 indicative of a position, orientation, movement, or acceleration of the speed measuring device 10. To this end, the inertial measurement module 16 may include one or more sensors (e.g., gyroscopes, accelerometers, and the like) configured to sense one or more of angular position ($\Gamma=(\alpha, \beta, \gamma)$), angular velocity ($\partial\Gamma/\partial t=(\partial\alpha/\partial t, \partial\beta/\partial t, \partial\gamma/\partial t)$), angular acceleration ($\partial^2\Gamma/\partial t^2=(\partial^2\alpha/\partial t^2, \partial^2\beta/\partial t^2, \partial^2\gamma/\partial t^2)$), angular displacement ($\Delta\Gamma=(\Delta\alpha, \Delta\beta, \Delta\gamma)$), linear position ($P=(x, y, z)$), linear velocity ($\partial P/\partial t=(\partial x/\partial t, \partial y/\partial t, \partial z/\partial t)$), linear acceleration ($\partial^2 P/\partial t^2=(\partial^2 x/\partial t^2, \partial^2 y/\partial t^2, \partial^2 z/\partial t^2)$), or linear displacement ($\Delta P=(\Delta x, \Delta y, \Delta z)$) in one or more dimensions (e.g., three-dimensions). In an embodiment of the invention, the inertial measurement module may include a six degrees of freedom Inertial Measurement Unit (IMU). Based on these signals, the processing module 12 may determine one or more of the position and orientation of the speed measuring device 10.

The speed sensing module 18 may be configured to determine the radial velocity $v_R$ of the target object, which is the speed at which the object is approaching or receding from the speed measuring device 10. The speed sensing module 18 may determine the radial velocity $v_R$ by emitting radio waves and detecting a change in frequency of the returned signal caused by the Doppler effect. In an alternative embodiment of the invention, the speed sensing module 18 may determine the radial velocity $v_R$ of the object by emitting pulses of laser light and determining the distance to the object over a period of time based on the amount of time each pulse takes to be reflected back. This series of distances may be used to determine a change in distance over time, thereby estimating the radial velocity $v_R$ of the object. For embodiments of the invention in which the speed sensing module 18 determines speed by making a series of distance measurements, speed sensing and range finding may be provided by the same module.

The rangefinder module 20 is configured to measure a distance from the speed measuring device 10 to the target at which the speed measuring device 10 is aimed. The rangefinder module 20 may use any suitable method for determining this distance, such as by timing the round-trip of a pulse of energy emitted by the speed measuring device 10 and reflected off the target (e.g., lidar, radar, sonar), ultrasonic range finding, or stereoscopic range finding.

The user interface 22 is operatively coupled to the processing module 12 to allow user to interact with the speed measuring device 10. The user interface 22 may include video or alphanumeric displays, a touch screen, a speaker, and any other suitable audio and visual indicators capable of providing data to the user. The user interface 22 may also include input devices and controls such as an alphanumeric keyboard, a pointing device, keypads, pushbuttons, control knobs, microphones, triggers, etc., capable of accepting commands or input from the user and transmitting the entered input to the processing module 12.

Figure 2:
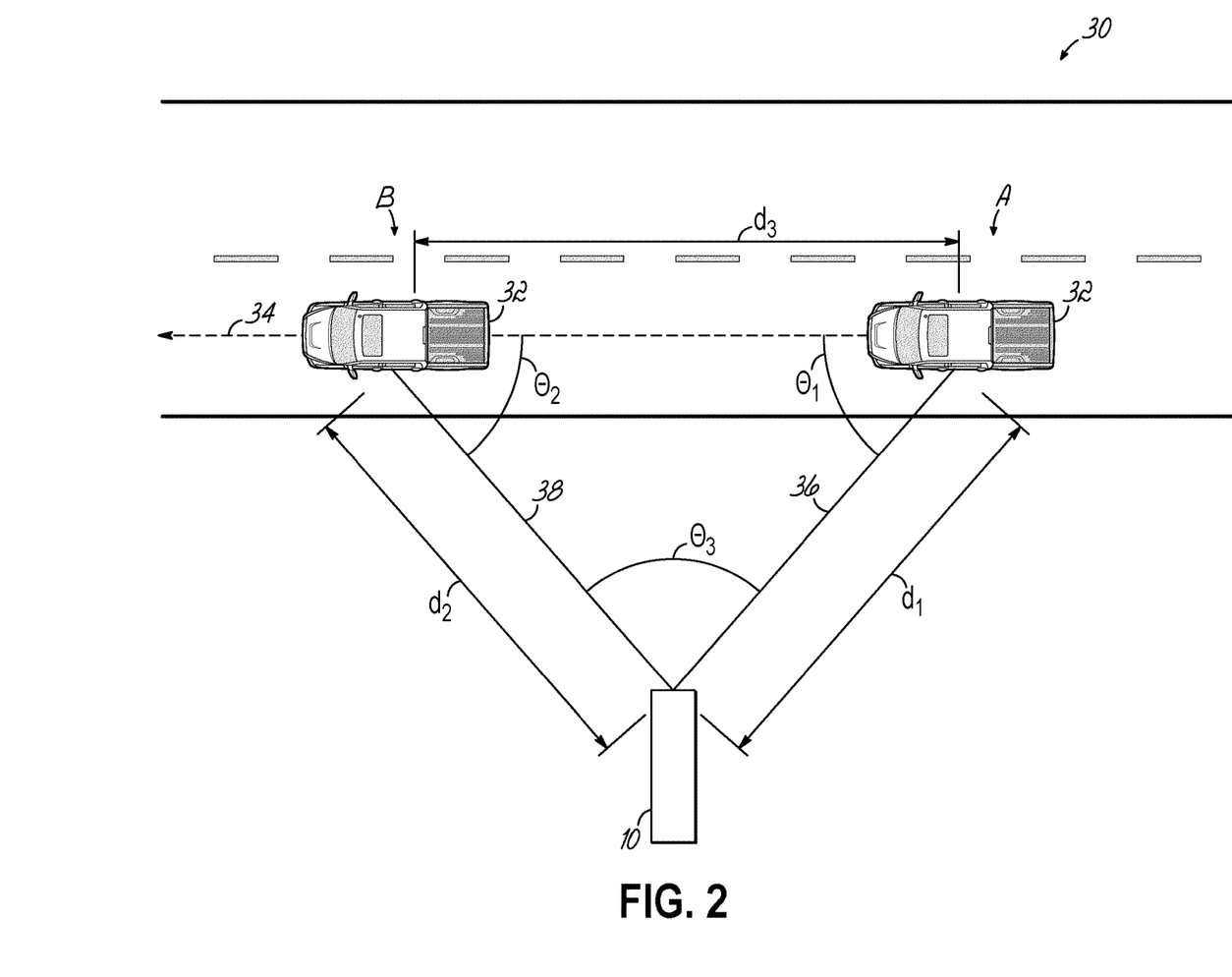
FIGS. 2 and 3 are diagrammatic views of exemplary operating environments of the speed measuring device of FIG. 1.

FIG. 2 depicts an exemplary operating environment 30 in which the speed measuring device 10 is being used to determine the absolute speed of an object 32, e.g., a vehicle. The object 32 has a direction of motion 34 (the direction in which the velocity vector of the object 32 is pointed) that does not pass through the observing position of the speed measuring device 10. When the object 32 is in position A, the object 32 is a distance $d_1$ from the speed measuring device 10, and a line-of-sight 36 between the speed measuring device 10 and the object 32 has an offset angle $\theta_1$ from the direction of motion 34. When the object 32 is in position B, the object 32 is a distance $d_2$ from the speed measuring device 10, and a line-of-sight 38 between the speed measuring device 10 and the object 32 has an offset angle $\theta_2$ from the direction of motion 34.

In an embodiment of the invention, the processing module 12 of speed measuring device 10 may determine the distance $d_1$ at time $t_1$ when the object 32 is in position A, the distance $d_2$ at time $t_2$ when the object 32 is in position B, and an angular displacement $\theta_3$. The angular displacement $\theta_3$ may be a preset angle between two rangefinder modules 20 of the speed measuring device 10, a preset angle through which a single rangefinder module 20 of speed measuring device 10 is moved while the object 32 moves from position A to position B, or an angle through which the speed measuring device 10 is moved between time $t_1$ and $t_2$ that is detected by the processing module 12.

By way of example, in response to input into the user interface 22, the processing module 12 may start a timer, determine an initial orientation of the speed measuring device 10, and determine the distance $d_1$ to the object 32. Determining the distance $d_1$ may include the processing module 12 transmitting a signal to the rangefinder module 20 that causes the module to measure the distance $d_1$ (e.g., by transmitting one or more pulses of laser light at the object 32 and timing reception of the return reflection), and receiving a signal from the rangefinder module 20 indicative of the distance $d_1$ to the object 32 (e.g., a round-trip time for the one or more laser pulses). The user input may be provided by the user pulling a trigger on the speed measuring device 10 while aiming the speed measuring device 10 at the object 32, or by some other suitable input.

After determining the distance $d_1$, the processing module 12 may wait for an amount of time $\Delta t=(t_2-t_1)$ to elapse during which the object 32 moves from position A to position B. The elapsed time Δt may be a predetermined amount of time (e.g., 0.1 to 1.0 seconds) or may be varied depending on a sensed condition (e.g., a time at which a trigger is pulled or a rate at which the speed measuring device 10 is being moved by the user). At time $t_2$, the processing module 12 may determine the distance $d_2$ using the rangefinder module 20 as described above with respect to determining the distance $d_1$. At time $t_2$, the processing module 12 may also determine the angular displacement $\theta_3$, e.g., based on signals from the inertial measurement module 16.

Once the line-of-sight distance $d_1$, line-of-sight distance $d_2$, and angular displacement $\theta_3$ are known, the processing module 12 may determine the distance $d_3$ the object 32 has travelled between time $t_1$ and $t_2$ as:

$$d_3 = \sqrt{d_1^2 + d_2^2 - 2 \times d_1 \times d_2 \times \cos(\theta_3)} \tag{Eqn. 1}$$

The absolute speed s of the object can then be determined as:

$$s = \frac{d_3}{t_2 - t_1} \tag{Eqn. 2}$$

Figure 3:
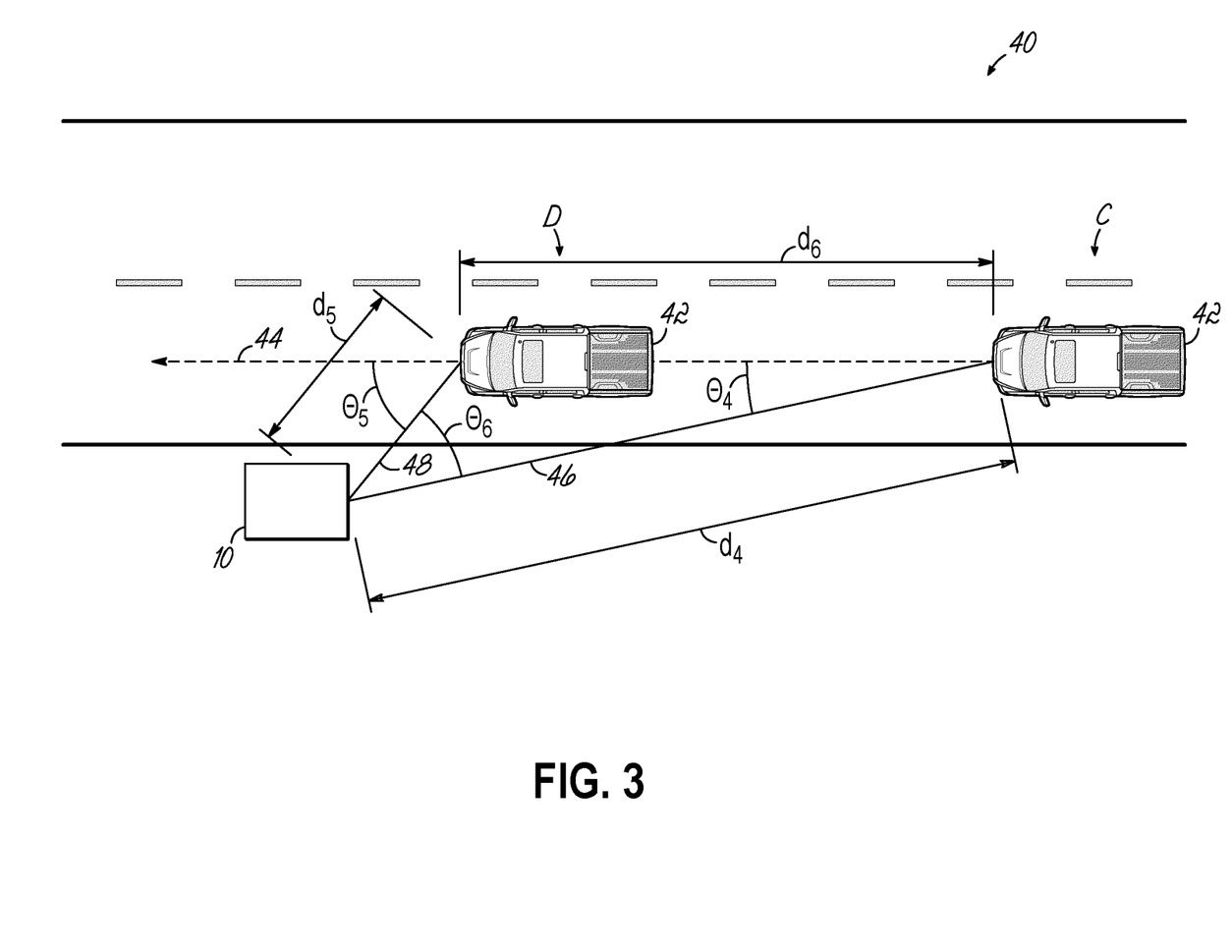

FIG. 3 depicts another exemplary operating environment 40 in which the speed measuring device 10 is being used to determine the absolute speed s of an object 42 having a direction of motion 44. When the object 42 is in position C, the object 42 is a distance $d_4$ from the speed measuring device 10, and the line-of-sight 46 between the speed measuring device 10 and the object 42 has an offset angle $\theta_4$ from the direction of motion 44. When the object 42 is in position D, the object 42 is a distance $d_5$ from the speed measuring device 10, and the line-of-sight 48 between the speed measuring device 10 and the object 42 has an offset angle $\theta_5$ from the direction of motion 44.

In a similar manner as described above with respect to FIG. 2, the processing module 12 of speed measuring device 10 may determine the distance $d_4$ at time $t_3$, the distance $d_5$ at time $t_4$, and the angular displacement $\theta_6$ of the speed measuring device 10 between time $t_3$ and $t_4$. The processing module 12 may then determine the absolute speed s of object 42 by calculating the distance $d_6$ traveled by the object 42 and dividing the distance $d_6$ by the elapsed time $\Delta t = (t_4 - t_3)$.

In an alternative embodiment of the invention, at time $t_3$, in addition to determining the distance $d_4$, the speed measuring device 10 may also determine the radial velocity $v_R$ of the object 42. The radial velocity $v_R$ may be determined, for example, by the processing module 12 activating the speed sensing module 18 and storing data indicative of the radial velocity $v_R$ measured by the speed sensing module 18 in memory. Once the distance $d_5$ and angular displacement $\theta_6$ are known, the processing module 12 may determine the offset angle $\theta_4$ as follows:

$$\theta_4 = \sin^{-1}\left(\frac{d_5 \times \sin\theta_6}{d_6}\right) \tag{Eqn. 3}$$

The processing module 12 may then compensate for the cosine effect to determine the absolute speed s of object 42 based on the radial velocity $v_R$ determined at time $t_3$ and the offset angle $\theta_4$ as follows:

$$s = \frac{v_R}{\cos\theta_4} \tag{Eqn. 4}$$

Advantageously, by measuring the radial velocity $v_R$ at time $t_3$ and correcting for the cosine effect once the offset angle $\theta_4$ is known, the speed measuring device 10 may directly determine the absolute speed s of object 42 while the object 42 is in position C. The absolute speed s can thereby be accurately determined for the object 42 when it is in a specific position C rather than as an average value over the distance $d_6$. This feature may be advantageous in cases where the object 42 is changing speed rapidly, e.g., is accelerating, decelerating, or changing direction.

Figure 4:
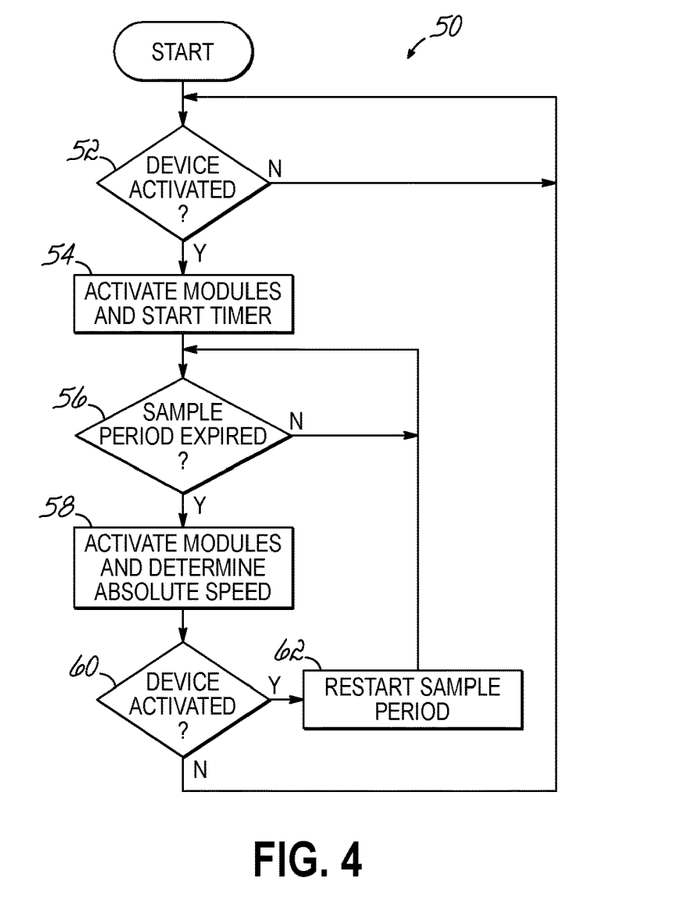
FIG. 4 is a flow chart of a process for determining the speed of an object that may be implemented by the speed measuring device of FIG. 1.

FIG. 4 depicts a flowchart illustrating a process 50 that may be implemented by the processing module 12 in accordance with an embodiment of the invention. In block 52, the process 50 determines if the speed measuring device 10 has been activated, e.g., by the user pulling a trigger or pressing a button of user interface 22. If the speed measuring device has not been activated ("NO" branch of decision block 52), the process 50 may remain in a standby loop waiting for input from the user. If the speed measuring device has been activated ("YES" branch of decision block 52), the process 50 proceeds to block 54.

In block 54, the process activates one or more modules and starts a timer. Activating the one or more modules may include activating the inertial measurement module 16 to determine a current position or orientation of the speed measuring device 10, activating the speed sensing module 18 to determine a radial velocity $v_R$ of the target object, and activating the rangefinder module 20 to determine a distance to a target object. The process 50 may store data indicative of one or more of the position, orientation, radial velocity $v_R$, and distance measured by the respective modules for later use in determining absolute speed, and proceed to block 56.

In an embodiment of the invention, there may be multiple types of activation, e.g., an aiming mode activation and a speed measuring mode activation. For example, the aiming mode may be entered in response to the trigger being pulled to a first position that causes the process 50 to activate the sighting module 14 while remaining in the standby loop. The speed measuring mode may then be entered in response to the trigger being pulled to a second position that causes the process 50 to activate one or more of the inertial, speed sensing, and rangefinder modules.

In block 56, the process 50 determines if a sample period has expired. The sample period may have expired if a predetermined amount of time has passed since activation of the timer, the speed measuring device 10 has been moved by a predetermined amount, or one of the one or more rangefinder modules 20 of speed measuring device 10 senses that the object has reached a predetermined position (e.g., position B or D in FIGS. 2 and 3, respectively). If the sample period has not expired ("NO" branch of decision block 56), the process 50 may remain in a sample period loop.

If the sample period has expired ("YES" branch of decision block 56), the process may proceed to block 58 and activate the one or more modules to determine one or more of the current position and orientation of the speed measuring device 10, the radial velocity $v_R$ of the target object, and the distance to the target object. The process 50 may then determine the absolute speed of the object as described above, display the speed on the user interface, and proceed to block 60.

In block 60, the process may determine if the speed measuring device 10 is still being activated by the user. If the speed measuring device 10 is still being activated ("YES" branch of decision block 60), the process may proceed to block 62, restart the sample period, and proceed to block 56. The process 50 may thereby repeatedly determine the absolute speed of the target object while the speed measuring device 10 is activated. If the speed measuring device 10 is not being activated by the user ("NO" branch of decision block 60), the process 50 may return to block 52 and re-enter the standby loop.

For sports applications, embodiments of the invention may be used to measure speeds of runners, animals, vehicles or any other objects moving at essentially right angles to the viewer, such as from a grand stand position. For law enforcement applications, embodiments of the invention may likewise be used to measure the speed of vehicles travelling across the field of view of the law enforcement officer, and therefore can be termed a "side street speed measuring device". This may enable law enforcement to monitor traffic from locations that are both safer for the officer and less likely to be seen by drivers of the vehicles being monitored than is possible with conventional speed measurement devices.

Figure 5:
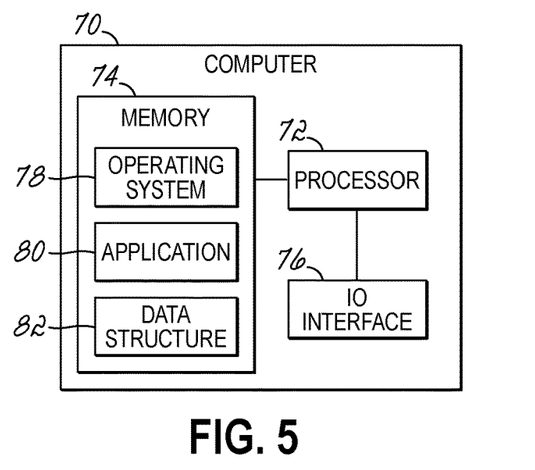
FIG. 5 is a diagrammatic view of a computer that may be used to implement one or more of the components or processes shown in FIGS. 1-4.

Referring now to FIG. 5, embodiments of the invention described above, or portions thereof (e.g., the processing module 12) may be implemented using one or more computer devices or systems, such as exemplary computer 70. The computer 70 may include a processor 72, a memory 74, and an input/output (I/O) interface 76.

The processor 72 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 74. Memory 74 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 72 may operate under the control of an operating system 78 that resides in memory 74. The operating system 78 may manage computer resources so that computer program code embodied as one or more computer software applications, such as an application 80 residing in memory 74, may have instructions executed by the processor 72. In an alternative embodiment, the processor 72 may execute the application 80 directly, in which case the operating system 78 may be omitted. One or more data structures 82 may also reside in memory 74, and may be used by the processor 72, operating system 78, or application 80 to store or manipulate data.

The I/O interface 76 may provide a machine interface that operatively couples the processor 72 to other devices and systems, such as the modules and the user interface of speed measuring device 10, as well as devices or networks external to the speed measuring device 10. The application 80 may thereby work cooperatively with external resources or networks by communicating via the I/O interface 76 to provide the various features, functions, applications, processes, or modules comprising embodiments of the invention. The application 80 may also have program code that is executed by one or more external resources, or otherwise rely on functions or signals provided by other system or network components external to the computer 70. Indeed, given the nearly endless hardware and software configurations possible, persons having ordinary skill in the art will understand that embodiments of the invention may include applications that are located externally to the computer 70, distributed among multiple computers or other external resources, or provided by computing resources (hardware and software) that are provided as a service over a network, such as a cloud computing service.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the flowcharts, sequence diagrams, or block diagrams.

The flowcharts and block diagrams depicted in the figures illustrate the architecture, functionality, or operation of possible implementations of systems, methods, or computer program products according to various embodiments of the invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A speed measuring device comprising:
   one or more rangefinder modules each configured to measure distances from the device to a target object;
   an inertial measurement module;
   one or more processors in communication with the one or more rangefinder modules and the inertial measurement module; and
   a memory coupled to the one or more processors and including program code that, when executed by the one or more processors, causes the device to:
   measure a first distance from the device to the target object along a first line-of-sight at a first time;
   measure a second distance from the device to the target object along a second line-of-sight at a second time;
   determine an angular displacement between the first line-of-sight and the second line-of-sight based on data received from the inertial measurement module; and
   determine an absolute speed of the target object based on the first distance, the second distance, and the angular displacement.

2. The device of claim 1 further comprising a speed sensing module in communication with the one or more processors and configured to measure radial velocities of the target object relative to the device, wherein the target object has a direction of movement and the program code further causes the device to:
   determine, at the first time, a radial velocity of the target object relative to the device; and
   determine an offset angle between the direction of movement of the target object and the first line-of-sight,
   wherein the absolute speed of the target object is determined by adjusting the radial velocity of the target object based on the offset angle to compensate for a cosine effect.

3. The device of claim 1 wherein the one or more rangefinder modules includes a first rangefinder module and a second rangefinder module, and the program code causes the device to measure the first distance with the first rangefinder module, and measure the second distance with the second rangefinder module.

4. The device of claim 3 wherein the first rangefinder module is oriented in a first direction, and the second rangefinder module is oriented in a second direction having the angular displacement from the first direction.

5. The device of claim 4 wherein the angular displacement is user adjustable.

6. The device of claim 1 wherein the program code causes the device to determine the angular displacement by:
   receiving first data from the inertial measurement module indicative of a first orientation of the device at the first time;

receiving second data from the inertial measurement module indicative of a second orientation of the device at the second time; and comparing the first data to the second data.

7. The device of claim 1 further comprising a sighting module in communication with the one or more processors, wherein the program code causes the device to:

receive imaging data from the sighting module; and display an image indicative of a point at which at least one of the one or more rangefinder modules is aimed based on the imaging data.

8. The device of claim 7 wherein the sighting module includes an imaging sensor sensitive to a wavelength of light emitted by the at least one rangefinder module, and the image indicative of the point at which the at least one rangefinder module is aimed shows an area illuminated by the at least one rangefinder module.

9. The device of claim 7 wherein the program code further causes the device to save one or more images captured by the sighting module in the memory.

10. A method of determining a speed of a target object, comprising:

measuring, by one or more rangefinder modules, a first distance from an observing position to the target object along a first line-of-sight at a first time;

measuring, by the one or more rangefinder modules, a second distance from the observing position to the target object along a second line-of-sight at a second time;

determining an angular displacement between the first line-of-sight and the second line-of-sight based on data received from an inertial measurement module; and determining an absolute speed of the target object based on the first distance, the second distance, and the angular displacement.

11. The method of claim 10 wherein the target object has a direction of movement and further comprising:

determining, at the first time, a radial velocity of the target object relative to the device; and determining an offset angle between the direction of movement of the target object and the first line-of-sight, wherein the absolute speed of the target object is determined by adjusting the radial velocity of the target object based on the offset angle to compensate for a cosine effect.

12. The method of claim 10 wherein the first distance is measured with a first rangefinder module, and the second distance is measured with a second rangefinder module.

13. The method of claim 12 wherein the first rangefinder module is oriented in a first direction, and the second rangefinder module is oriented in a second direction having the angular displacement from the first direction.

14. The method of claim 13 wherein the angular displacement is user adjustable.

15. The method of claim 10 wherein determining the angular displacement comprises:

receiving first data from the inertial measurement module indicative of a first orientation of a device at the first time;

receiving second data from the inertial measurement module indicative of a second orientation of the device at the second time; and comparing the first data to the second data.

16. The method of claim 10 further comprising:

receiving imaging data from a sighting module; and displaying an image indicative of a point at which at least one of one or more rangefinder modules is aimed based on the imaging data.

17. The method of claim 16 wherein the sighting module includes an imaging sensor sensitive to a wavelength of light emitted by the at least one rangefinder module, and the image indicative of the point at which the at least one rangefinder module is aimed shows an area illuminated by the at least one rangefinder module.

18. A computer program product comprising:

a non-transitory computer-readable storage medium; and program code stored on the non-transitory computer-readable storage medium that, when executed by one or more processors, causes the one or more processors to:

measure a first distance from an observing position to a target object along a first line-of-sight at a first time;

measure a second distance from the observing position to the target object along a second line-of-sight at a second time;

determine an angular displacement between the first line-of-sight and the second line-of-sight based on data received from an inertial measurement module; and determine an absolute speed of the target object based on the first distance, the second distance, and the angular displacement.

* * * * *